J. R. ARMSTRONG.
NUT LOCK.
APPLICATION FILED MAY 8, 1913.
1,082,389.
Patented Dec. 23, 1913.
2 SHEETS—SHEET 1.
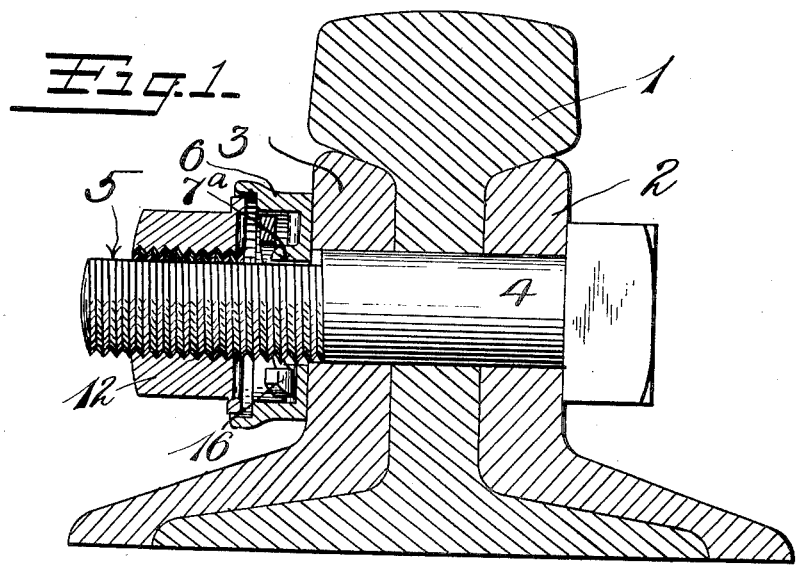
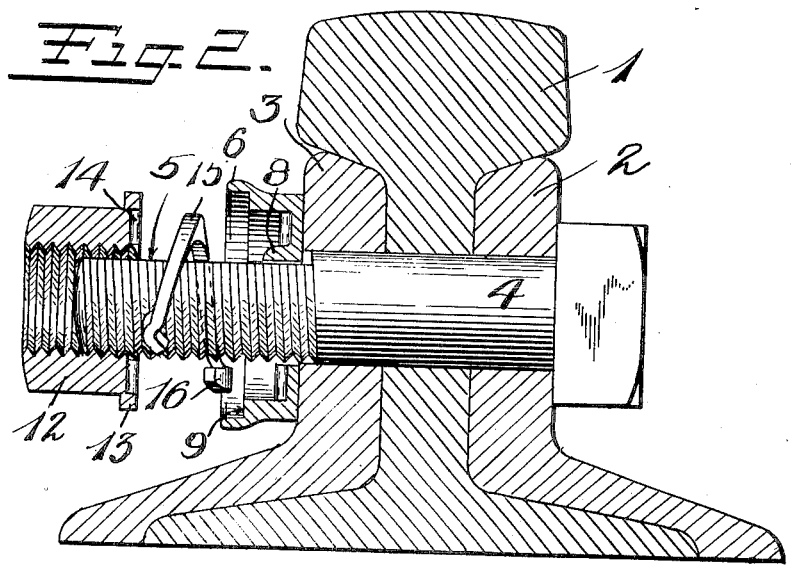
Witnesses:
Inventor
J. R. ARMSTRONG
By his Attorneys J. R. ARMSTRONG.
NUT LOCK.
APPLICATION FILED MAY 8, 1913.
1,082,389.
Patented Dec. 23, 1913.
2 SHEETS—SHEET 2.
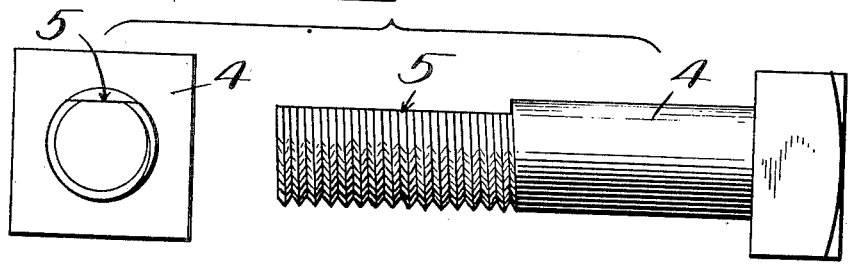
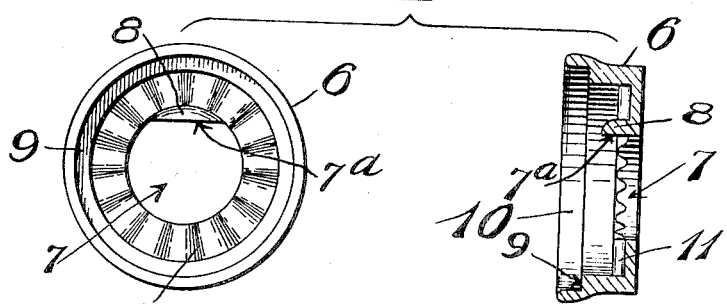
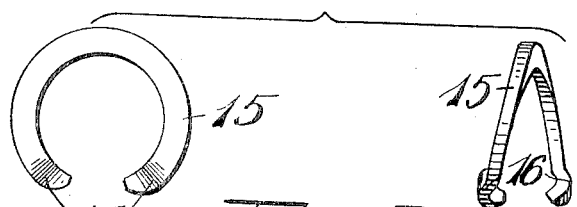
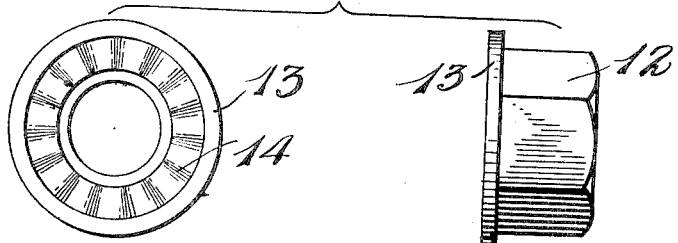
Witnesses:
Inventor
J. R. ARMSTRONG
By his Attorneys

UNITED STATES PATENT OFFICE.

JOHN R. ARMSTRONG, OF CRANSTON, RHODE ISLAND, ASSIGNOR TO O. K. NUT LOCK COMPANY, OF PROVIDENCE, RHODE ISLAND, A CORPORATION OF RHODE ISLAND.

NUT-LOCK.

1,082,389. Specification of Letters Patent. Patented Dec. 23, 1913.

Application filed May 8, 1913. Serial No. 766,455.

*To all whom it may concern:*

Be it known that I, JOHN R. ARMSTRONG, a citizen of the United States, residing at Cranston, Providence county, Rhode Island, have invented certain new and useful Improvements in Nut-Locks, of which the following is a full, clear and exact description.

This invention relates to nut locking means of the type embodying a cupped washer and a coöperating nut and spring pawl member, and is designed to provide means whereby the washer is secured against jamming on the bolt; whereby the proper positioning of the nut against the washer is insured; and whereby a more efficient housing for the parts is provided. These and other advantages will be more fully seen from the following specification taken in connection with the accompanying drawings forming part thereof, in which—

Figure 1 is a transverse sectional view through a rail joint showing a bolt member embodying the present invention, the parts being in locked position. Fig. 2 is a similar view with parts in unlocked position. Fig. 3 is a detail in end and side elevation of the bolt. Fig. 4 is a detail in elevation and transverse section of the washer. Fig. 5 shows detail views of the locking spring.
Fig. 6 is a detail in rear and side elevations of the nut.

Referring to the drawings by numerals: 1 indicates a rail and 2 and 3 fish plates of conventional form, these parts representing structure which it is necessary to bind together by means of a bolt and nut and wherein my nut locking means may be efficaciously employed.

4 designates a bolt whose outer threaded 
end is flatted as at 5. Coöperating with this flatted end of the bolt is a cupped washer 6 having a central bore 7 therein, the contour of this bore embodying a flatted portion 7ª corresponding to the flatted portion of the bolt. Extending inwardly or toward the open end of the cupped washer from the edge of the bore 7 through its base, is a lug 8 or other axial enlargement, preferably integral therewith, and of sufficient extent to provide a relatively broad bearing on the flatted face of the bolt and serving to maintain the edges of the washer adjacent said aperture in a plane above the bolt threads so that they cannot enter therebetween and jam, but is held with its edges concentric with the bolt shank. Adjacent its outer or open end, the interior face of the washer is shouldered down to provide an annular bearing wall 9, the adjacent wall 10 of the washer at its outer end forming a guide flange for the nut. The interior face of the base of the cupped washer is provided preferably with a series of annular corrugations 11 forming a ratchet surface.

A nut 12 which coöperates with the bolt and washer is provided at its inner end with an annular flange 13, the diameter of which is slightly less than that of the guide flange 10 of the washer, and is greater than the decreased diameter of the interior of the washer beyond the bearing face 9. The interior face of this nut within the annular flange 13 may also be provided with an annular series of corrugations 14 in the same relative plane as the corrugations 11 of the cupped washer. Coöperating with the ratchet surfaces formed by the corrugations 11 and 14 is a spiral spring 15 having adjacent its opposite ends and on opposing faces, projections 16 forming pawls which coöperate with the ratchet surfaces aforesaid. The depth of the cupped portion of the washer 6 between its corrugated base and its bearing wall 9 is less than the distance between the opposite ends of the uncompressed spiral spring 15, but greater than the distance between the opposite faces of said spiral spring were the same compressed to bring its ends in the same plane.

In operation, the bolt would be inserted through suitable bores in the rail and fish plates and the cupped washer slipped thereover, the flatted portion of the bolt shank and of the bore 7 of the washer acting to prevent relative rotation of these parts. The thickness of the apertured base of the cupped washer is ordinarily such that it is possible for the edges adjacent the aperture to bite into the groove between the threads on the bolt and incline the rear face of the washer at an angle to the opposing face of the fish plate so that the parts would bind, and even contact between the rear face of the washer and the fish plate be impossible. The provision of the lug 8 in the flatted bolt shank construction prevents such action inasmuch as this lug affords a sufficient broad and even bearing to maintain the washer in the proper plane. It will be obvious that other means may be provided for retaining the washer against rotation relative to the bolt. Assuming, therefore, that the cupped washer has been moved up on the bolt shank to bring its rear face uniformly against the outer face of the fish plate, the nut 12 is then screwed up on the bolt shank, its flange 13 being guided within the cupped washer by the guide flange 10 thereof and the inner face of this flange bearing against the annular bearing face 9 within the cupped washer. The spiral spring 15 is, of course, inserted within the cupped washer before the nut is screwed on the bolt so that as the nut is screwed up, the spiral spring is compressed and its pawl ends are held by the compressed spring in interlocking engagement with the ratchet surfaces 11 and 14 of the washer and nut respectively. The depth of the cupped washer is such that it prevents the full compression of this spring to bring its ends in the same plane and thereby distort the spring, but is sufficiently less than the distance between the ends of the uncompressed spring to enable efficient locking compression thereof.

By providing the guide flange 10 and bearing wall 9, the outer open face of the cupped washer is completely closed when the nut is screwed up thereagainst and the washer is securely housed within these parts. Likewise, moisture and dirt are prevented from entering within the housing after the nut has been screwed up.

While I prefer to provide the nut 12 with a ratchet surface such as 14, it will be obvious that other means for holding one end of the spiral spring may be employed, although such a ratchet surface as 14 is preferable.

I have herein described what I consider a preferable embodiment of the invention, but desire it understood that structurally and in relative arrangement of parts it may be varied within the spirit of the invention and the scope of the appended claims.

What I claim, therefore, and desire to secure by Letters Patent is:

1. In nut lock construction, in combination, a bolt, a cupped washer having its base apertured to fit over and move longitudinally of the bolt shank and provided with a lug adjacent the aperture in its base, said lug forming a bearing surface of curvature corresponding to that of the bolt shank and of a length to span adjacent threads of the bolt whereby said cupped washer is positioned thereon with its base extending at right angles thereto and with its edges adjacent said aperture positioned concentric to said bolt shank and outside of the plane of the threads thereof, a nut coöperating with said shank and adapted to bear against the edge of said cupped washer, and a spiral spring mounted on the bolt shank and interposed between said cupped washer and nut, and ratchet surfaces formed at the base of said cupped washer and on the opposing face of said nut and coöperating with said spiral spring to lock said nut on said bolt.

2. As an article of manufacture, a cupped washer provided with a bolt aperture in its base, said base having an enlargement extending therefrom adjacent said aperture and axially thereof and of a curvature to correspond with that of a bolt shank, the outer open end of said washer being provided with an annular nut bearing surface and with an annular guiding flange concentric therewith and extending outwardly therefrom.

JOHN R. ARMSTRONG.

Witnesses:
 HENDERSON F. HILL,
 E. E. MORSE.